US012541821B2

United States Patent
Jandial et al.

(10) Patent No.: US 12,541,821 B2
(45) Date of Patent: Feb. 3, 2026

(54) DIFFUSION MODEL IMAGE GENERATION

(71) Applicant: ADOBE INC., San Jose, CA (US)

(72) Inventors: Surgan Jandial, Jammu Kashmir (IN); Siddarth Ramesh, Telangana (IN); Shripad Vilasrao Deshmukh, Maharashtra (IN); Balaji Krishnamurthy, Uttar Pradesh (IN)

(73) Assignee: ADOBE INC., San Jose, CA (US)

( * ) Notice: Subject to any disclaimer, the term of this patent is extended or adjusted under 35 U.S.C. 154(b) by 658 days.

(21) Appl. No.: 17/823,582

(22) Filed: Aug. 31, 2022

(65) Prior Publication Data

US 2024/0070816 A1  Feb. 29, 2024

(51) Int. Cl.
| | |
|---|---|
| *G06V 10/764* | (2022.01) |
| *G06T 5/50* | (2006.01) |
| *G06T 5/70* | (2024.01) |
| *G06V 10/74* | (2022.01) |
| *G06V 10/774* | (2022.01) |
| *G06V 20/70* | (2022.01) |

(52) U.S. Cl.
CPC .............. *G06T 5/50* (2013.01); *G06T 5/70* (2024.01); *G06V 10/761* (2022.01); *G06V 10/764* (2022.01); *G06V 10/774* (2022.01); *G06V 20/70* (2022.01); *G06T 2207/20081* (2013.01); *G06T 2207/20084* (2013.01)

(58) Field of Classification Search
CPC .. G06V 10/774; G06V 10/764; G06V 10/761; G06V 20/70; G06T 5/50; G06T 5/70; G06T 2207/20081; G06T 2207/20084
See application file for complete search history.

(56) References Cited

PUBLICATIONS

Avrahami, Omri, Dani Lischinski, and Ohad Fried. "Blended Diffusion for Text-driven Editing of Natural Images." arXiv preprint arXiv:2111.14818v2, Mar. 28, 2022. (Year: 2022).*
Hertz A, Mokady R, Tenenbaum J, Aberman K, Pritch Y, Cohen-Or D. Prompt-to-prompt image editing with cross attention control. arXiv preprint arXiv:2208.01626. Aug. 2, 2022. (Year: 2022).*
Kim G, Kwon T, Ye JC. DiffusionCLIP: Text-Guided Diffusion Models for Robust Image Manipulation. arXiv preprint arXiv: 2110.02711v6. Aug. 11, 2022. (Year: 2022).*
Singh, et al., "On Conditioning the Input Noise for Controlled Image Generation with Diffusion Models", arXiv preprint arXiv:2205.03859v1 [cs.CV] May 8, 2022, 5 pages.
Nichol, et al., "Improved Denoising Diffusion Probabilistic Models", In Proceedings of the 38th International Conference on Machine Learning, PMLR 139, (pp. 8162-8171), (Jul. 2021).
Song, et al., "Improved Techniques for Training Score-Based Generative Models", 34th Conference on Neural Information Processing Systems (NeurIPS 2020), 33, pp. 12438-12448, (2020).

\* cited by examiner

*Primary Examiner* — Tracy Mangialaschi
(74) *Attorney, Agent, or Firm* — F. CHAU & ASSOCIATES, LLC

(57) ABSTRACT

Systems and methods for image processing are described. Embodiments of the present disclosure receive a reference image depicting a reference object with a target spatial attribute; generate object saliency noise based on the reference image by updating random noise to resemble the reference image; and generate an output image based on the object saliency noise, wherein the output image depicts an output object with the target spatial attribute.

20 Claims, 14 Drawing Sheets

Algorithm 1 Generation Using Object Saliency Noise
────────────────────────────────────────────────
Require: Classifier loss function $\mathcal{L}_\theta$, IG model $\mathcal{I}$, inverting steps $k$, diffusion model $\mathcal{D}_\phi$, localisation guiding image $x^*$, ground truth class $y$, target class $t$ $grad \leftarrow \nabla_\theta \mathcal{L}_\theta(x^*, y)$
$x \leftarrow \mathcal{I}(\mathcal{L}_\theta, grad, y, k)$
$x' \leftarrow \frac{x - \mu}{\sigma}$
$out \leftarrow \mathcal{D}_\phi(x', t)$
return $out$
────────────────────────────────────────────────

FIG. 14

DIFFUSION MODEL IMAGE GENERATION

BACKGROUND

The following relates generally to digital image processing. Digital image processing refers to the use of a computer to edit a digital image using an algorithm or a processing network. Image processing software are commonly used for image editing, image generation, etc. Image generation is a subfield of digital image processing. In some cases, image generation may depend on signals from users via user commands, i.e., conditioning the image generation process to output generated images that have certain attributes (e.g., color, style, object locations). This process is also known as conditional image generation. In some examples, a machine learning model (e.g., diffusion-based image generation models) may be used for conditional image generation.

However, conventional image processing systems are not able to generate new images of a target object with a desired orientation, e.g., spatial properties such as position, rotation, pose, etc. Therefore, there is a need in the art for an improved image processing system that can efficiently manage image generation with target attributes.

SUMMARY

The present disclosure describes systems and methods for image processing. Embodiments of the present disclosure include an image processing apparatus configured to receive a reference image depicting a reference object with a target spatial attribute and generate an output image that depicts an output object with the target spatial attribute. The image processing apparatus takes an original image and produces pseudo-random noise that has orientation properties of the original, and subsequently includes a diffusion model to generate an image with that orientation. The image processing apparatus can generate images that have desired spatial properties based on the reference image while preserving other content such as the background. The image processing apparatus generates new images of a target object with a desired orientation (e.g., desired spatial attributes) as indicated in the reference image. This way, users can easily control target attributes in generated images by adjusting the reference image.

A method, apparatus, and non-transitory computer readable medium for image processing are described. One or more embodiments of the method, apparatus, and non-transitory computer readable medium include receiving a reference image depicting a reference object with a target spatial attribute; generating object saliency noise based on the reference image by updating random noise to resemble the reference image; and generating an output image based on the object saliency noise, wherein the output image depicts an output object with the target spatial attribute.

A method, apparatus, and non-transitory computer readable medium for image processing are described. One or more embodiments of the method, apparatus, and non-transitory computer readable medium include receiving a training set comprising a training image and a class label for an object in the training image; adding noise to the training image to obtain a noisy training image; removing the noise from the noisy training image based on the class label using a denoising diffusion probabilistic model (DDPM) to obtain a denoised training image; updating parameters of the DDPM based on the denoised training image; generating object saliency noise based on a reference image by updating random noise to resemble the reference image; and generating an output image based on the object saliency noise using the DDPM, wherein the output image depicts an output object with a target spatial attribute from the reference image.

An apparatus and method for image processing are described. One or more embodiments of the apparatus and method include an inverting gradients model configured to generate object saliency noise based on a reference image by updating random noise to resemble the reference image and a DDPM configured to generate an output image based on the object saliency noise, wherein the output image depicts an output object with a target spatial attribute from the reference image.

BRIEF DESCRIPTION OF THE DRAWINGS

FIG. 14 shows an example of image generation algorithm according to aspects of the present disclosure.

DETAILED DESCRIPTION

Figure 1:
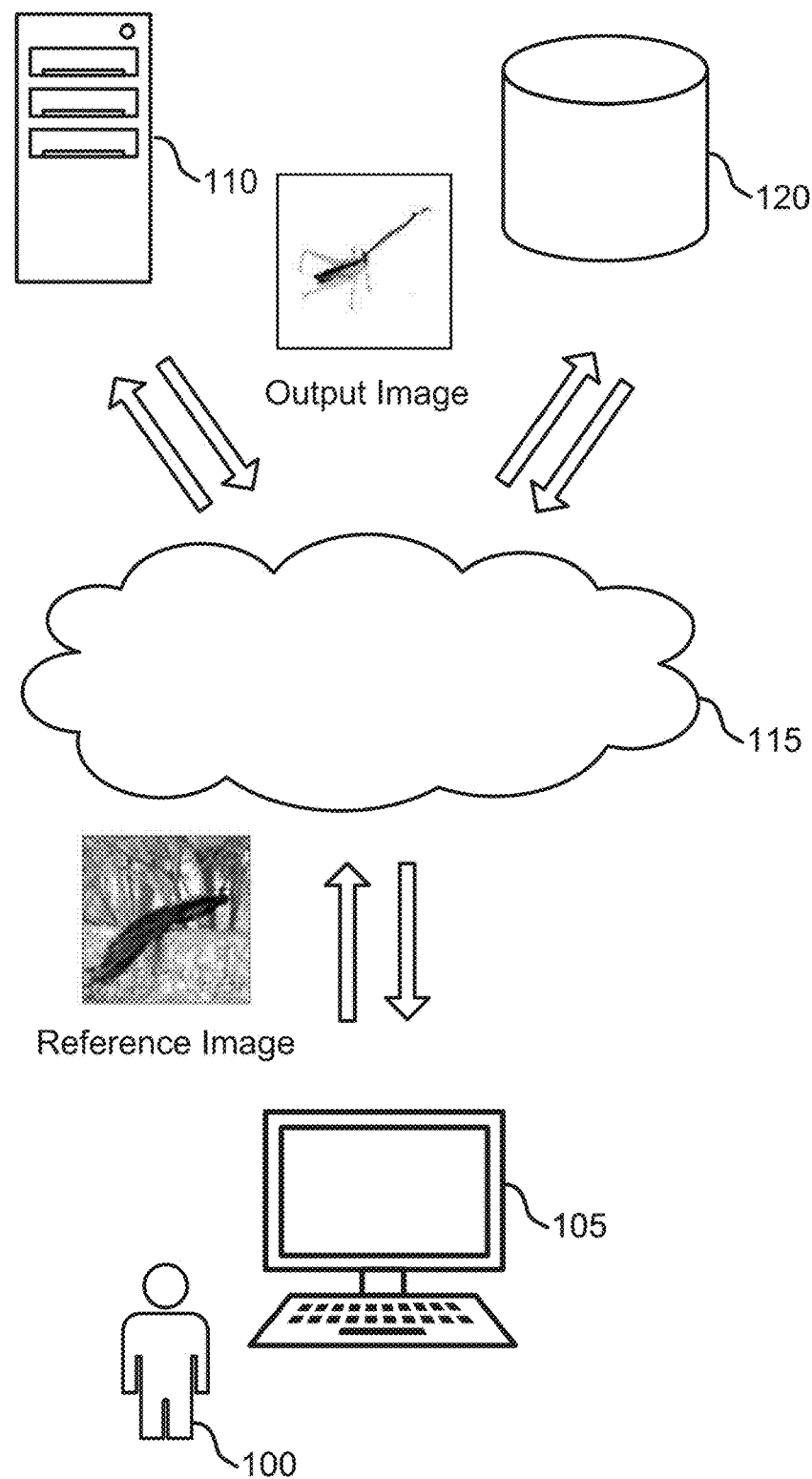
FIG. 1 shows an example of an image processing system according to aspects of the present disclosure.

The present disclosure describes systems and methods for image processing. Embodiments of the present disclosure include an image processing apparatus configured to receive a reference image depicting a reference object with a target spatial attribute and generate an output image that depicts an output object with the target spatial attribute. The image processing apparatus takes an original image and makes pseudo-random noise that has orientation properties of the original, and subsequently includes a diffusion model to generate an image with that orientation. The image processing apparatus can generate images that have desired spatial properties based on the reference image while preserving other content such as the background. The image processing apparatus generates new images of a target object with a desired orientation (e.g., desired spatial attributes) as indicated in the reference image. This way, users can easily control target attributes in generated images by adjusting the reference image.

Recently, generative adversarial networks (GANs) have been adapted to the field of conditional image generation. In some examples, diffusion-based generation models are applied to this type of task. Conventional generation models iteratively apply a guidance function to the output of a generation step in the model to impose conditioning on the output image. Thus, such systems are difficult to train when certain conditions are imposed for generation of images. For example, conventional systems incur large computational overhead when facing text-based condition "a man sitting on a sofa." Additionally, diffusion-based generation models fail to take user control or commands into consideration such that output images may not include desirable target attributes.

Embodiments of the present disclosure include an image processing apparatus configured to receive a reference image depicting a reference object with a target spatial attribute and generate an output image that depicts an output object with the target spatial attribute. The reference image is from a user request or command. In some examples, the image processing apparatus generates new images of a target object with a desired orientation.

According to some embodiments, the image processing apparatus takes an original image (i.e., a reference image) and makes pseudo-random noise that captures or includes orientation properties of the reference image. For example, an inverting gradients model of the image processing apparatus is configured to generate object saliency noise based on a reference image by updating random noise to resemble the reference image. Further, a diffusion model (e.g., a denoising diffusion probabilistic model or DDPM) generates an image with that target orientation as indicated in the reference image. The reference image indicates desired color scheme, style, object location, pose, orientation, etc. In some examples, object location may include coordinates information and indicates a relative position of an object compared to other objects in the reference image.

According to some embodiments, the image generation apparatus is configured to extract salient features of a reference image through inverting gradients. An inverting gradients model of the image generation apparatus includes intermediate layers that output intermediate images. Random gaussian noise is iteratively passed through the inverting gradients model. The images from the intermediate layers are used as an input noise to guide conditional image generation of a diffusion model. In some cases, a reference image with desired spatial attributes is selected, a random gaussian noise is input to the inverting gradients model to generate noisy half-constructed images, and these half-constructed images are then input to a diffusion model to output the target image.

According to an embodiment, a neural network is trained to reverse the noising process using optimization. The noisy samples capture high-level information of the reference image, such as desired pose of an object in the target image. In some examples, the image processing apparatus receives a reference image with a desired spatial attribute and generates an image having a different object (i.e., different class) with substantially similar spatial attributes as in the reference image.

In some examples, the diffusion model receives the object saliency noise and a target class label of the output object as input. The diffusion model generates an output image based on the target class label while preserving spatial attributes of the reference image. The output of the diffusion model is controlled based on the input noise to the model, and then the image generation process is conditioned on the input noise to increase control over the spatial attributes to be shown in the target image. This way, users can easily control the target attributes in generated images by adjusting the reference image.

Embodiments of the present disclosure may be used in the context of image generation applications. For example, an image processing network based on the present disclosure may take a reference image and efficiently generate an output image that depicts an output object with target spatial attribute (e.g., share similar position and orientation as an object in the reference image). An example application, according to some embodiments, is provided with reference to FIG. 4. Details regarding the architecture of an example image processing apparatus are provided with reference to FIGS. 1-3. Example processes for image processing are provided with reference to FIGS. 4-12. Example training processes are described with reference to FIGS. 13-14.

Network Architecture

Figure 2:
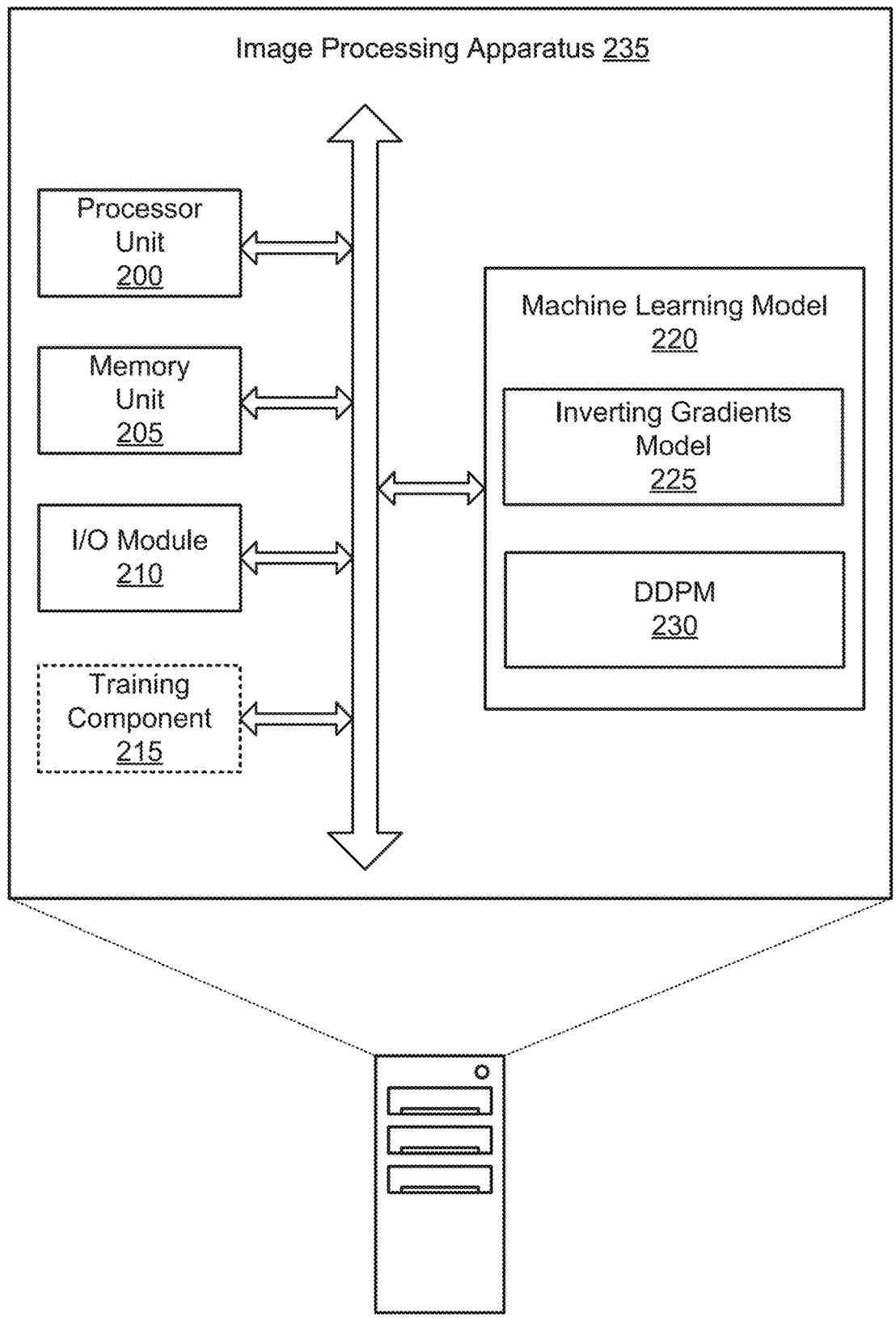
FIG. 2 shows an example of an image processing apparatus according to aspects of the present disclosure.
Figure 3:
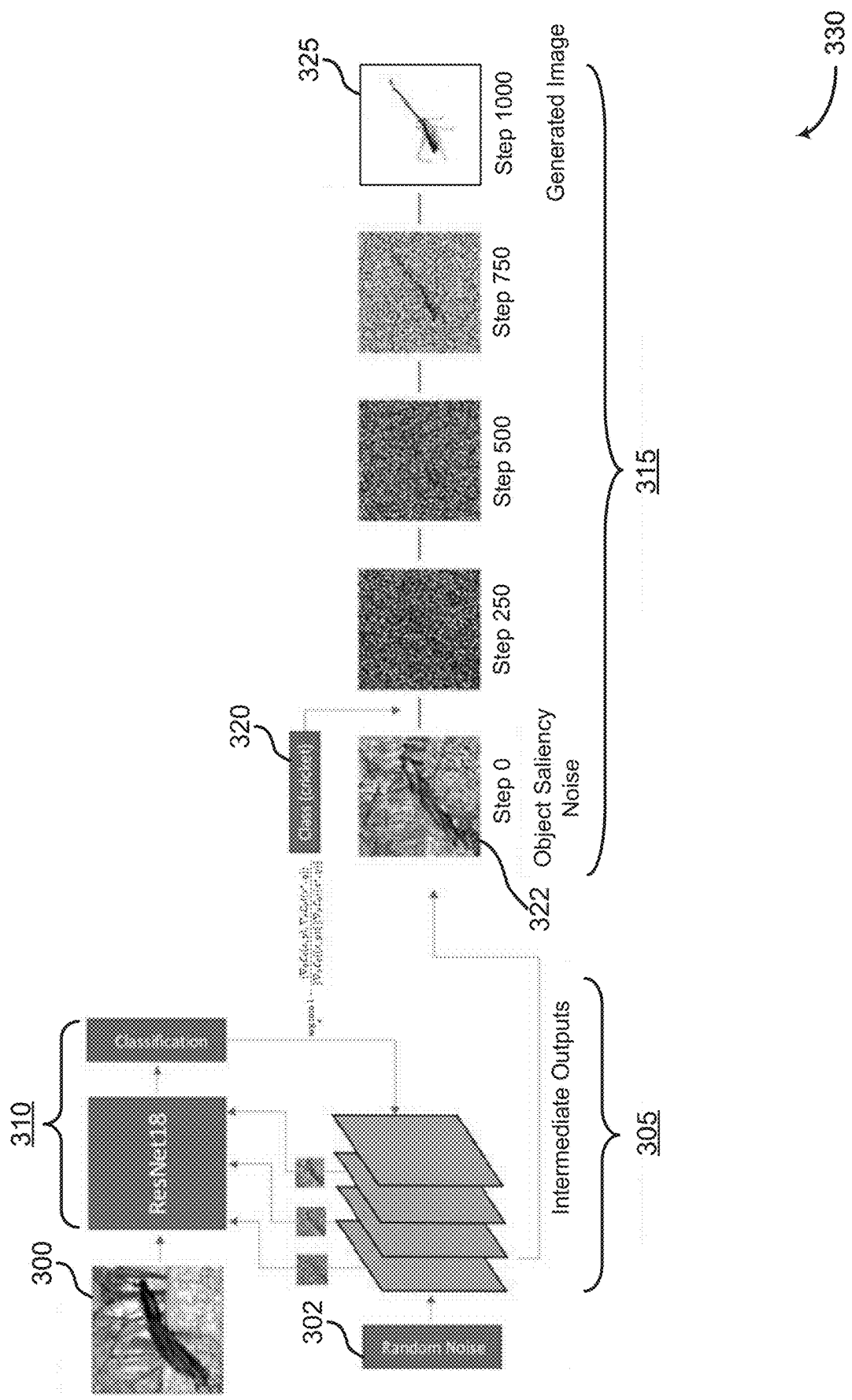
FIG. 3 shows an example of a machine learning model according to aspects of the present disclosure.

In FIGS. 1-3, an apparatus and method for image processing are described. One or more embodiments of the apparatus and method include an inverting gradients model configured to generate object saliency noise based on a reference image by updating random noise to resemble the reference image and a DDPM configured to generate an output image based on the object saliency noise, wherein the output image depicts an output object with a target spatial attribute from the reference image.

Some examples of the apparatus and method further include a processor unit configured to perform operations of the inverting gradients model or the DDPM. Some examples further include a memory unit including parameters of the inverting gradients model or parameters of the DDPM.

In some embodiments, the inverting gradients model comprises an image classification network including an encoder and a decoder. The inverting gradients model comprises an optimizer configured to maximize a similarity between a gradient of the reference image and a gradient of the object saliency noise.

FIG. 1 shows an example of an image processing system according to aspects of the present disclosure. The example shown includes user 100, user device 105, image processing apparatus 110, cloud 115, and database 120. Image processing apparatus 110 is an example of, or includes aspects of, the corresponding element described with reference to FIGS. 2, 5, and 6.

The user device 105 may be a personal computer, laptop computer, mainframe computer, palmtop computer, personal assistant, mobile device, or any other suitable processing apparatus. In some examples, the user device 105 includes software that incorporates an image processing application (e.g., an image editing application). The image editing application may either include or communicate with image processing apparatus 110. In some examples, the image editing application on user device 105 may include functions of image processing apparatus 110.

A user interface may enable user 100 to interact with user device 105. In some embodiments, the user interface may include an audio device, such as an external speaker system, an external display device such as a display screen, or an input device (e.g., remote control device interfaced with the user interface directly or through an I/O controller module). In some cases, a user interface may be a graphical user interface (GUI). In some examples, a user interface may be represented in code which is sent to the user device and rendered locally by a browser.

As an example shown in FIG. 1, user 100 selects a reference image and image processing apparatus 110 receives the reference image via e.g., user device 105 and cloud 115. The reference image depicts a reference object (e.g., a peacock) with a target spatial attribute. User 100 is interested in generating an output image that includes substantially similar spatial attributes compared to the peacock object in the reference image. In some examples, target spatial attribute includes a position, an orientation, a scale, a pose, or any combination thereof.

Image processing apparatus 110 generates object saliency noise based on the reference image by updating random noise to resemble the reference image. Image processing apparatus 110 generates an output image based on the object saliency noise. The output image depicts an output object (e.g., a cricket) with the target spatial attribute. In some examples, the cricket in the output image has substantially similar orientation and position compared to the peacock in the reference image. Image processing apparatus 110 returns the output image to user 100 via cloud 115 and user device 105. The process of using image processing apparatus 110 is further described with reference to FIG. 4.

Image processing apparatus 110 includes a computer implemented network that includes an inverting gradients model and DDPM. Image processing apparatus 110 may also include a processor unit, a memory unit, an I/O module, and a training component. The training component is used to train a machine learning model (or an image processing network). Additionally, image processing apparatus 110 can communicate with database 120 via cloud 115. In some cases, the architecture of the image processing network is also referred to as a network or a network model. Further detail regarding the architecture of image processing apparatus 110 is provided with reference to FIGS. 1-3. Further detail regarding the operation of image processing apparatus 110 is provided with reference to FIGS. 5-12.

In some cases, image processing apparatus 110 is implemented on a server. A server provides one or more functions to users linked by way of one or more of the various networks. In some cases, the server includes a single microprocessor board, which includes a microprocessor responsible for controlling all aspects of the server. In some cases, a server uses microprocessor and protocols to exchange data with other devices/users on one or more of the networks via hypertext transfer protocol (HTTP), and simple mail transfer protocol (SMTP), although other protocols such as file transfer protocol (FTP), and simple network management protocol (SNMP) may also be used. In some cases, a server is configured to send and receive hypertext markup language (HTML) formatted files (e.g., for displaying web pages). In various embodiments, a server comprises a general purpose computing device, a personal computer, a laptop computer, a mainframe computer, a supercomputer, or any other suitable processing apparatus.

Cloud 115 is a computer network configured to provide on-demand availability of computer system resources, such as data storage and computing power. In some examples, cloud 115 provides resources without active management by the user. The term cloud is sometimes used to describe data centers available to many users over the Internet. Some large cloud networks have functions distributed over multiple locations from central servers. A server is designated an edge server if it has a direct or close connection to a user. In some cases, cloud 115 is limited to a single organization. In other examples, cloud 115 is available to many organizations. In one example, cloud 115 includes a multi-layer communications network comprising multiple edge routers and core routers. In another example, cloud 115 is based on a local collection of switches in a single physical location.

Database 120 is an organized collection of data. For example, database 120 stores data in a specified format known as a schema. Database 120 may be structured as a single database, a distributed database, multiple distributed databases, or an emergency backup database. In some cases, a database controller may manage data storage and processing in database 120. In some cases, a user interacts with database controller. In other cases, database controller may operate automatically without user interaction.

FIG. 2 shows an example of an image processing apparatus according to aspects of the present disclosure. The example shown includes image processing apparatus 235, processor unit 200, memory unit 205, I/O module 210, training component 215, and machine learning model 220. Image processing apparatus 235 is an example of, or includes aspects of, the corresponding element described with reference to FIG. 1. According to an embodiment, image processing apparatus 235 includes processor unit 200, memory unit 205, I/O module 210, training component 215, and machine learning model 220. In one embodiment, machine learning model 220 includes inverting gradients model 225 and DDPM 230. Machine learning model 220 is an example of, or includes aspects of, the corresponding element described with reference to FIG. 3.

Processor unit 200 is an intelligent hardware device, (e.g., a general-purpose processing component, a digital signal processor (DSP), a central processing unit (CPU), a graphics processing unit (GPU), a microcontroller, an application specific integrated circuit (ASIC), a field programmable gate array (FPGA), a programmable logic device, a discrete gate or transistor logic component, a discrete hardware component, or any combination thereof). In some cases, processor unit 200 is configured to operate a memory array using a memory controller. In other cases, a memory controller is integrated into processor unit 200. In some cases, processor unit 200 is configured to execute computer-readable instructions stored in a memory to perform various functions. In some embodiments, processor unit 200 includes special purpose components for modem processing, baseband processing, digital signal processing, or transmission processing.

According to some embodiments, processor unit 200 is configured to perform operations of inverting gradients model 225 or DDPM 230. Memory unit 205 includes parameters of inverting gradients model 225 or parameters of DDPM 230.

Examples of memory unit 205 include random access memory (RAM), read-only memory (ROM), or a hard disk. Examples of memory unit 205 include solid state memory and a hard disk drive. In some examples, memory unit 205 is used to store computer-readable, computer-executable software including instructions that, when executed, cause a processor to perform various functions described herein. In some cases, memory unit 205 contains, among other things, a basic input/output system (BIOS) which controls basic hardware or software operation such as the interaction with peripheral components or devices. In some cases, a memory controller operates memory cells. For example, the memory controller can include a row decoder, column decoder, or both. In some cases, memory cells within a memory store information in the form of a logical state.

I/O module 210 (e.g., an input/output interface) may include an I/O controller. The I/O controller may manage input and output signals for a device. I/O controller may also manage peripherals not integrated into a device. In some cases, an I/O controller may represent a physical connection or port to an external peripheral. In some cases, an I/O controller may utilize an operating system such as iOS®, ANDROID®, MS-DOS®, MS-WINDOWS®, OS/2®, UNIX®, LINUX®, or another known operating system. In other cases, an I/O controller may represent or interact with a modem, a keyboard, a mouse, a touchscreen, or a similar device. In some cases, an I/O controller may be implemented as part of a processor. In some cases, a user may interact with a device via I/O controller or via hardware components controlled by an I/O controller.

According to some embodiments of the present disclosure, image processing apparatus 235 includes a computer implemented artificial neural network (ANN) for generating object saliency noise and image generation. An ANN is a hardware or a software component that includes a number of connected nodes (i.e., artificial neurons), which loosely correspond to the neurons in a human brain. Each connection, or edge, transmits a signal from one node to another (like the physical synapses in a brain). When a node receives a signal, it processes the signal and then transmits the processed signal to other connected nodes. In some cases, the signals between nodes comprise real numbers, and the output of each node is computed by a function of the sum of its inputs. Each node and edge is associated with one or more node weights that determine how the signal is processed and transmitted.

According to some embodiments, image processing apparatus 235 includes a convolutional neural network (CNN) for classification and image generation. CNN is a class of neural networks that is commonly used in computer vision or image classification systems. In some cases, a CNN may enable processing of digital images with minimal preprocessing. A CNN may be characterized by the use of convolutional (or cross-correlational) hidden layers. These layers apply a convolution operation to the input before signaling the result to the next layer. Each convolutional node may process data for a limited field of input (i.e., the receptive field). During a forward pass of the CNN, filters at each layer may be convolved across the input volume, computing the dot product between the filter and the input. During the training process, the filters may be modified so that they activate when they detect a particular feature within the input.

According to some embodiments, training component 215 receives a training set including a training image and a class label for an object in the training image. In some examples, training component 215 adds noise to the training image to obtain a noisy training image. Training component 215 removes the noise from the noisy training image based on the class label using DDPM 230 to obtain a denoised training image. Training component 215 updates parameters of DDPM 230 based on the denoised training image. Training component 215 generates a set of progressively noisier versions of the training image. Training component 215 removes a portion of the noise from each of the set of progressively noisier versions of the training image to obtain a set of progressively denoised versions of the training image, where the parameters of DDPM 230 are updated based on the set of progressively denoised versions of the training image. Training component 215 trains an image classification network to generate class labels for images, where the object saliency noise is generated using the image classification network. In some examples, training component 215 is part of another apparatus other than image processing apparatus 235.

According to some embodiments, machine learning model 220 receives a reference image depicting a reference object with a target spatial attribute. In some examples, the target spatial attribute includes a position, an orientation, a scale, a pose, or any combination thereof, and the object saliency noise includes the target spatial attribute.

According to some embodiments, inverting gradients model 225 generates object saliency noise based on the reference image by updating random noise to resemble the reference image. In some examples, inverting gradients model 225 generates intermediate noise based on the random noise. Inverting gradients model 225 computes a first gradient of a classification loss for the intermediate noise. In some examples, inverting gradients model 225 computes a second gradient of the classification loss for the reference image. Inverting gradients model 225 computes a similarity score based on the first gradient and the second gradient. Inverting gradients model 225 updates the intermediate noise based on the similarity score, where the object saliency noise is generated based on the updated intermediate noise. In some embodiments, the object saliency noise includes the target spatial attribute. In some examples, a set of salient regions of the object saliency noise spatially correspond to a set of salient regions of the reference image, respectively.

According to some embodiments, inverting gradients model 225 generates object saliency noise based on a reference image by updating random noise to resemble the reference image. In some examples, inverting gradients model 225 generates intermediate noise based on the random noise. Inverting gradients model 225 computes a first gradient of a classification loss for the intermediate noise. Inverting gradients model 225 computes a second gradient of the classification loss for the reference image. Inverting gradients model 225 computes a similarity score based on the first gradient and the second gradient. Inverting gradients model 225 updates the intermediate noise based on the similarity score, where the object saliency noise is generated based on the updated intermediate noise.

According to some embodiments, inverting gradients model 225 is configured to generate object saliency noise based on a reference image by updating random noise to resemble the reference image. In some embodiments, inverting gradients model 225 includes an image classification network including an encoder and a decoder. In some embodiments, inverting gradients model 225 includes an optimizer configured to maximize a similarity between a gradient of the reference image and a gradient of the object saliency noise. Inverting gradients model 225 is an example of, or includes aspects of, the corresponding element described with reference to FIG. 3.

According to some embodiments, DDPM 230 generates an output image based on the object saliency noise, where the output image depicts an output object with the target spatial attribute (e.g., a target spatial attribute from the reference image). In some examples, DDPM 230 identifies a target class label of the output object. DDPM 230 is applied to the object saliency noise based on the target class label to obtain the output image. DDPM 230 modifies the object saliency noise based on input parameters of DDPM 230 to obtain normalized object saliency noise, where DDPM 230 is applied to the normalized object saliency noise. DDPM 230 identifies a target class label different from a class label of the reference object, where the output object is characterized by the target class label.

In some examples, DDPM 230 identifies a target class label of the output object, where the output image is generated based on the target class label. DDPM 230 modifies the object saliency noise based on input parameters of DDPM 230 to obtain normalized object saliency noise, where DDPM 230 is applied to the normalized object saliency noise. DDPM 230 is an example of, or includes aspects of, the corresponding element described with reference to FIG. 3.

The described methods may be implemented or performed by devices that include a general-purpose processor, a digital signal processor (DSP), an application specific integrated circuit (ASIC), a field programmable gate array (FPGA) or other programmable logic device, discrete gate or transistor logic, discrete hardware components, or any combination thereof. A general-purpose processor may be a microprocessor, a conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be implemented in hardware or software and may be executed by a processor, firmware, or any combination thereof. If implemented in software executed by a processor, the functions may be stored in the form of instructions or code on a computer-readable medium.

Computer-readable media includes both non-transitory computer storage media and communication media including any medium that facilitates transfer of code or data. A non-transitory storage medium may be any available medium that can be accessed by a computer. For example, non-transitory computer-readable media can comprise random access memory (RAM), read-only memory (ROM), electrically erasable programmable read-only memory (EEPROM), compact disk (CD) or other optical disk storage, magnetic disk storage, or any other non-transitory medium for carrying or storing data or code.

Also, connecting components may be properly termed computer-readable media. For example, if code or data is transmitted from a website, server, or other remote source using a coaxial cable, fiber optic cable, twisted pair, digital subscriber line (DSL), or wireless technology such as infrared, radio, or microwave signals, then the coaxial cable, fiber optic cable, twisted pair, DSL, or wireless technology are included in the definition of medium. Combinations of media are also included within the scope of computer-readable media.

FIG. 3 shows an example of a machine learning model 330 according to aspects of the present disclosure. The example shown includes reference image 300, random noise 302, inverting gradients model 305, image classification network 310, DDPM 315, target class label 320, object saliency noise 322, output image 325, and machine learning model 330.

According to an embodiment of the present disclosure, machine learning model 330 is configured to generate object saliency noise 322 as guidance to subsequent image generation. Inverting gradients model 305 extracts high-level spatial features of reference image 300 through inverting gradients. Further, the extracted features are used as an input noise to guide the image generation of a diffusion model (e.g., DDPM 315). Machine learning model 330 takes reference image 300 having desired spatial attributes as input. Machine learning model 330 passes random Gaussian noise (e.g., random noise 302) through inverting gradients model 305 to iteratively transform it to an image. The iterative transformation is performed with the objective of minimizing a cost function based on the outputs of each of intermediate layers of inverting gradients model 305. The cost function ensures that gradients of the reconstructed image have the maximum cosine similarity with the gradients of reference image 300. A pre-trained ResNet model (e.g., ResNet18) is used for estimating the gradients.

According to an embodiment, the noisy half-constructed images from intermediate layers of inverting gradients model 305 are used as input to a diffusion model (e.g., DDPM 315). The noisy samples capture the high-level coarse features of reference image 300 (referred to as object saliency noise 322). Object saliency noise 322 supplies information to DDPM 315 about the desired pose, orientation, and/or position of the object in the target image. Additionally, DDPM 315 takes target class label 320 as input. DDPM 315 takes the class information (e.g., class label "cricket") as input and generates the target image (i.e., output image 325) preserving the spatial attributes of reference image 300. Output image 325 depicts an object of class cricket.

Reference image 300 is an example of, or includes aspects of, the corresponding element described with reference to FIG. 11. Inverting gradients model 305 is an example of, or includes aspects of, the corresponding element described with reference to FIG. 2.

According to some embodiments, image classification network 310 generates classification features based on the intermediate noise using an encoder. In some examples, image classification network 310 applies a decoder to the classification features to obtain intermediate classification information, where the first gradient is computed based on the intermediate classification information.

According to an embodiment, machine learning model 330 modifies object saliency noise 322 based on input parameters of DDPM 315 to obtain normalized object saliency noise, wherein DDPM 315 is applied to the normalized object saliency noise. DDPM 315 is an example of, or includes aspects of, the corresponding element described with reference to FIGS. 2 and 12. Output image 325 is an example of, or includes aspects of, the corresponding element described with reference to FIGS. 5, 6, 8, and 12. Machine learning model 330 is an example of, or includes aspects of, the corresponding element described with reference to FIG. 2.

Image Generation

In FIGS. 4-12, a method, apparatus, and non-transitory computer readable medium for image processing are described. One or more embodiments of the method, apparatus, and non-transitory computer readable medium include receiving a reference image depicting a reference object with a target spatial attribute; generating object saliency noise based on the reference image by updating random noise to resemble the reference image; and generating an output image based on the object saliency noise, wherein the output image depicts an output object with the target spatial attribute.

Some examples of the method, apparatus, and non-transitory computer readable medium further include generating intermediate noise based on the random noise. Some examples further include computing a first gradient of a classification loss for the intermediate noise. Some examples further include computing a second gradient of the classification loss for the reference image. Some examples further include computing a similarity score based on the first gradient and the second gradient. Some examples further include updating the intermediate noise based on the similarity score, wherein the object saliency noise is generated based on the updated intermediate noise.

Some examples of the method, apparatus, and non-transitory computer readable medium further include generating classification features based on the intermediate noise using an encoder of an image classification network. Some examples further include applying a decoder of the image classification network to the classification features to obtain intermediate classification information, wherein the first gradient is computed based on the intermediate classification information.

Some examples of the method, apparatus, and non-transitory computer readable medium further include identifying a target class label of the output object. Some examples further include applying a denoising diffusion probabilistic model (DDPM) to the object saliency noise based on the target class label to obtain the output image.

Some examples of the method, apparatus, and non-transitory computer readable medium further include modifying the object saliency noise based on input parameters of a DDPM to obtain normalized object saliency noise, wherein the DDPM is applied to the normalized object saliency noise.

Some examples of the method, apparatus, and non-transitory computer readable medium further include identifying a target class label different from a class label of the reference object, wherein the output object is characterized by the target class label.

In some examples, the target spatial attribute includes a position, an orientation, a scale, a pose, or any combination thereof. In some examples, the object saliency noise includes the target spatial attribute. In some examples, a plurality of salient regions of the object saliency noise spatially correspond to a plurality of salient regions of the reference image, respectively.

Figure 4:
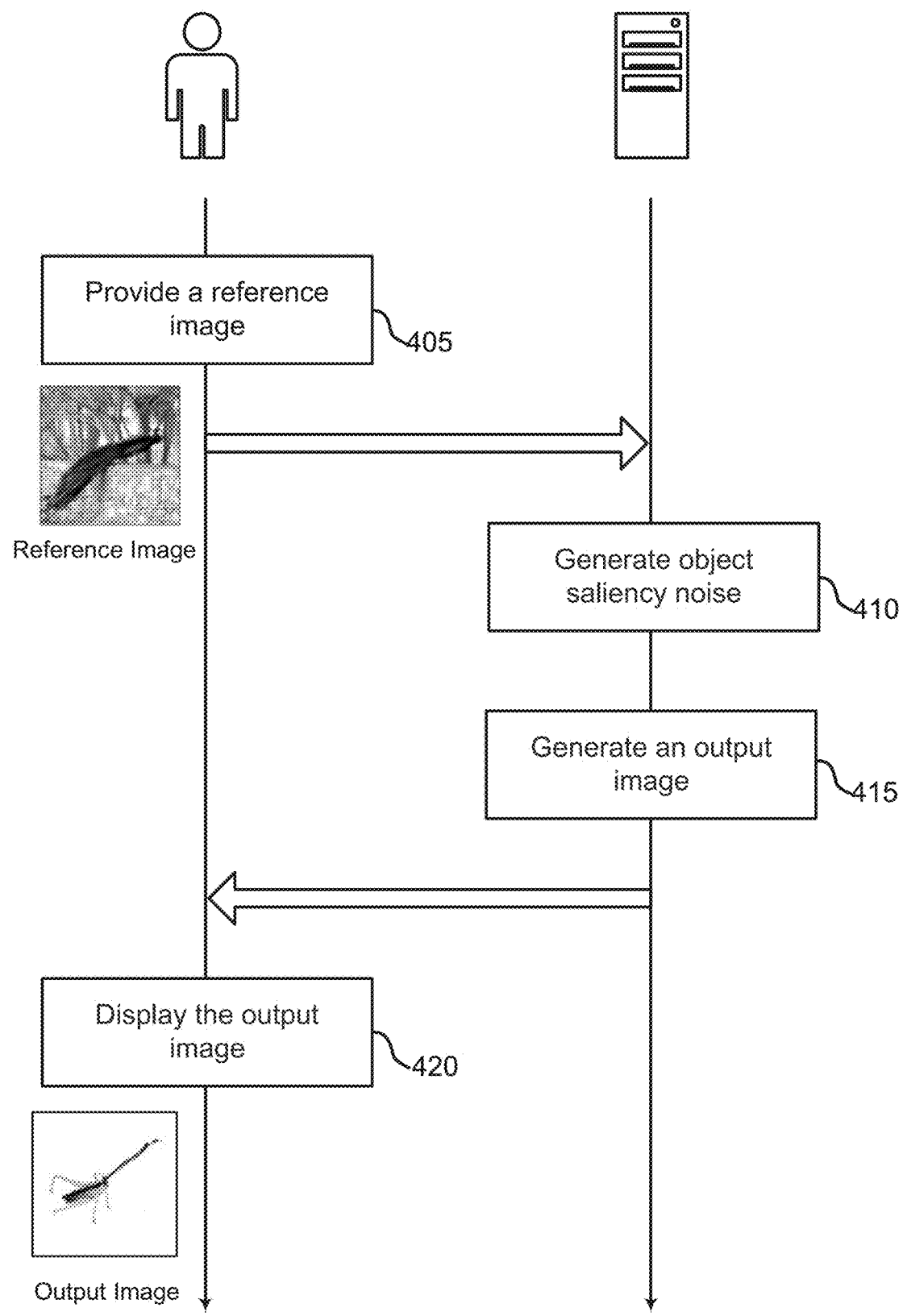
FIG. 4 shows an example of image generation according to aspects of the present disclosure.

FIG. 4 shows an example of image generation according to aspects of the present disclosure. In some examples, these operations are performed by a system including a processor executing a set of codes to control functional elements of an apparatus such as image processing apparatus 235 shown in FIG. 2. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 405, the user provides a reference image. In some cases, the operations of this step refer to, or may be performed by, a user via user device 105 as described with reference to FIG. 1. As an example shown in FIG. 4, the reference image depicts a peacock object.

At operation 410, the system generates object saliency noise. In some cases, the operations of this step refer to, or may be performed by, an image processing apparatus as described with reference to FIGS. 1 and 2. In some examples, a set of salient regions of the object saliency noise spatially correspond to a set of salient regions of the reference image, respectively.

At operation 415, the system generates an output image. In some cases, the operations of this step refer to, or may be performed by, an image processing apparatus as described with reference to FIGS. 1 and 2. In some examples, the image processing apparatus is configured to control the output image of a diffusion model (e.g., DDPM 230) by conditioning its input noise. This way, the user has control over subject pose, position, rotation, orientation, etc., during image generation.

At operation 420, the system displays the output image to the user. In some cases, the operations of this step refer to, or may be performed by, an image processing apparatus as described with reference to FIGS. 1 and 2. For example, the output image depicts a cricket that has substantially similar spatial attributes such as orientation and position compared to those of the peacock in the reference image.

Figure 5:
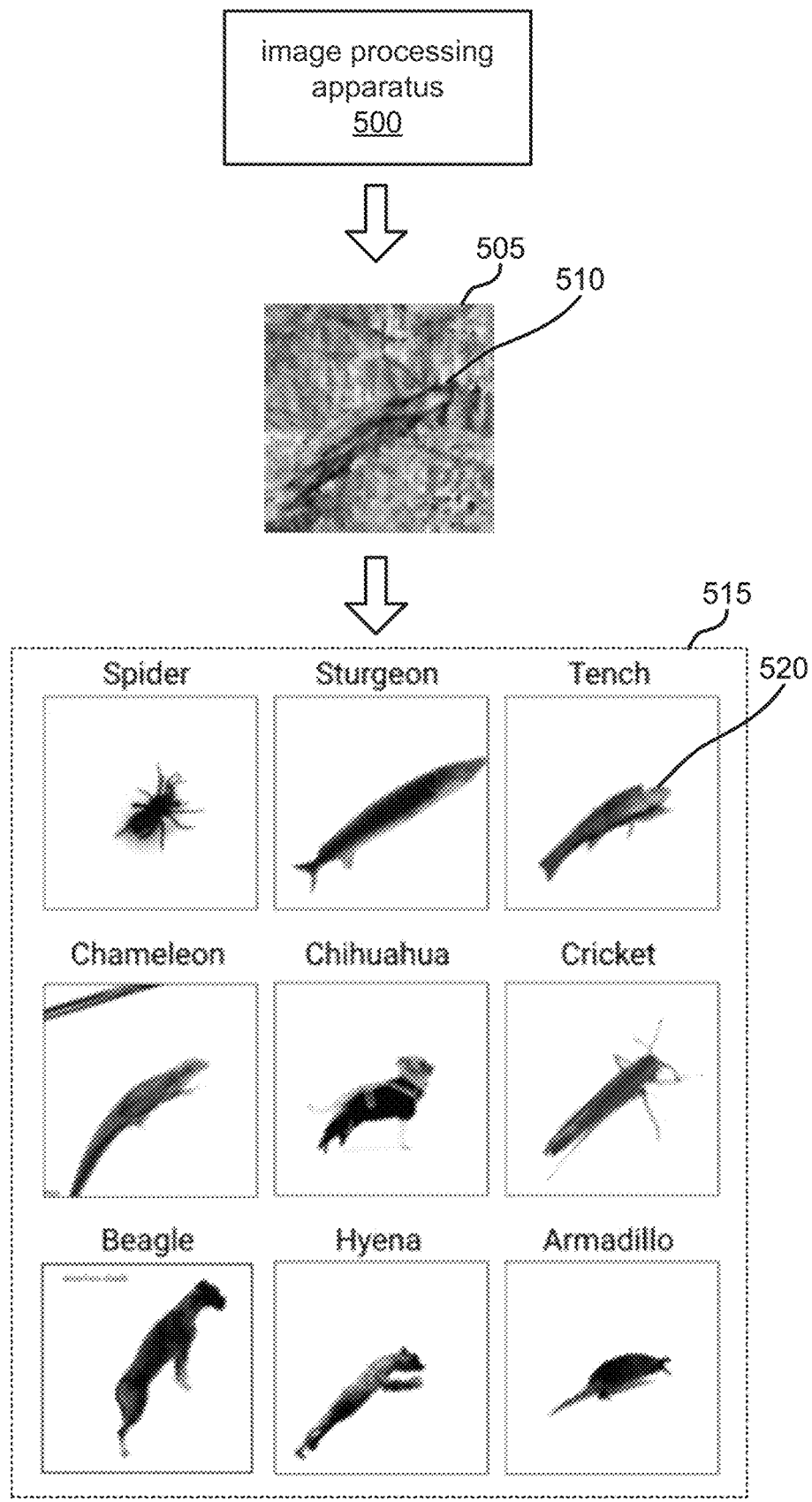
FIG. 5 shows an example of image generation process for multiple classes according to aspects of the present disclosure.

FIG. 5 shows an example of image generation process for multiple classes according to aspects of the present disclosure. The example shown includes image processing apparatus 500, object saliency noise 505, reference object 510, output images 515, and output object 520. Object saliency noise 505 is generated based on a reference image. Image processing apparatus 500 is an example of, or includes aspects of, the corresponding element described with reference to FIGS. 1, 2, and 6.

FIG. 5 shows an example of output images of image generation process. The output images are generated based on object saliency noise 505. The diffusion model (e.g., DDPM) generates images in the constrained orientation for multiple classes (e.g., spider, sturgeon, trench). Output image 515, for example the third image on the first row, includes output object 520, which has a substantially similar orientation, position, pose, scale, or any combination thereof as those spatial attributes in the reference image (or object saliency noise 505).

In some example experiments, image processing apparatus 500 generates images from various classes in ImageNet by conditioning on a single noise. FIG. 5 shows output of nine different classes using the same noise. Embodiments of the present disclosure are not limited to nine different classes. Classes may include, but are not limited to, insects, fish, legged-animals, snakes as well as man-made tools such as screwdriver, computer mouse, and airliner. A same noise can be used to localize such classes of objects. Accordingly, image processing apparatus 500 is generalizable across multiple classes.

Object saliency noise 505 is an example of, or includes aspects of, the corresponding element described with reference to FIGS. 3, 6, 8, 11, and 12. Reference object 510 is an example of, or includes aspects of, the corresponding element described with reference to FIG. 6. Output image 515 is an example of, or includes aspects of, the corresponding element described with reference to FIGS. 3, 6, 8, and 12. Output object 520 is an example of, or includes aspects of, the corresponding element described with reference to FIG. 6.

Figure 6:
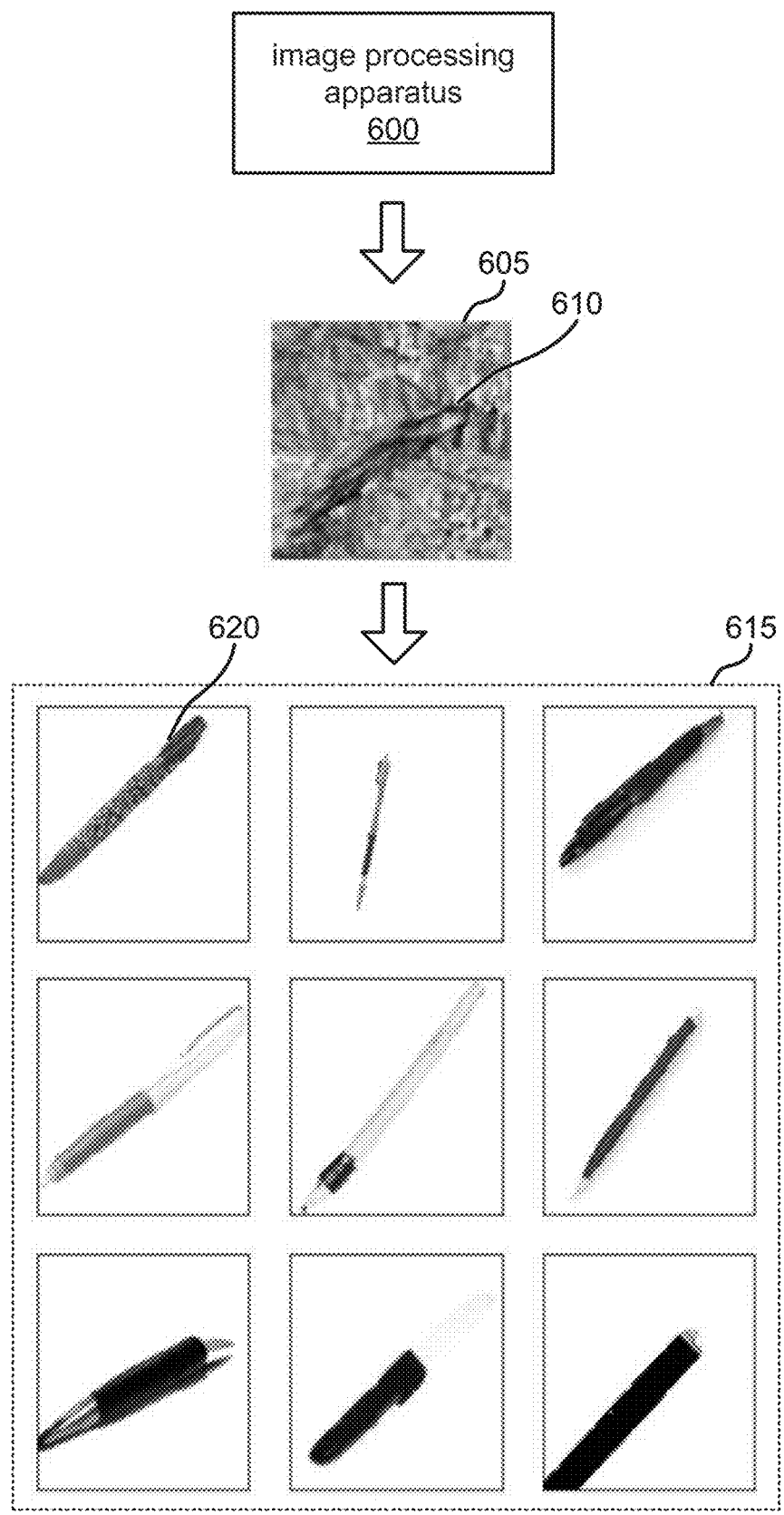
FIG. 6 shows an example of image generation relates to a single class according to aspects of the present disclosure.

FIG. 6 shows an example of image generation relates to a single class according to aspects of the present disclosure. The example shown includes image processing apparatus 600, object saliency noise 605 based on a reference image, reference object 610, output images 615, and output object 620. Image processing apparatus 610 is an example of, or includes aspects of, the corresponding element described with reference to FIGS. 1, 2, and 5. FIG. 6 shows results of image generation across a single class with the same object saliency noise 605. Output images 615 depict a pen. The variation in these pen images and the aspects is conditioned from the input noise.

Image processing apparatus 600 generates images from a same class using single noise. Image processing apparatus 600 generates images for class "pen". The images have robust variation and follow the localization as in object saliency noise 605. Users can condition generation of images for a desired class with a desired object pose.

Object saliency noise 605 is an example of, or includes aspects of, the corresponding element described with reference to FIGS. 3, 5, 8, 11, and 12. Reference object 610 is an example of, or includes aspects of, the corresponding element described with reference to FIG. 5.

Output image 615 is an example of, or includes aspects of, the corresponding element described with reference to FIGS. 3, 5, 8, and 12. Output object 620 is an example of, or includes aspects of, the corresponding element described with reference to FIG. 5.

Figure 7:
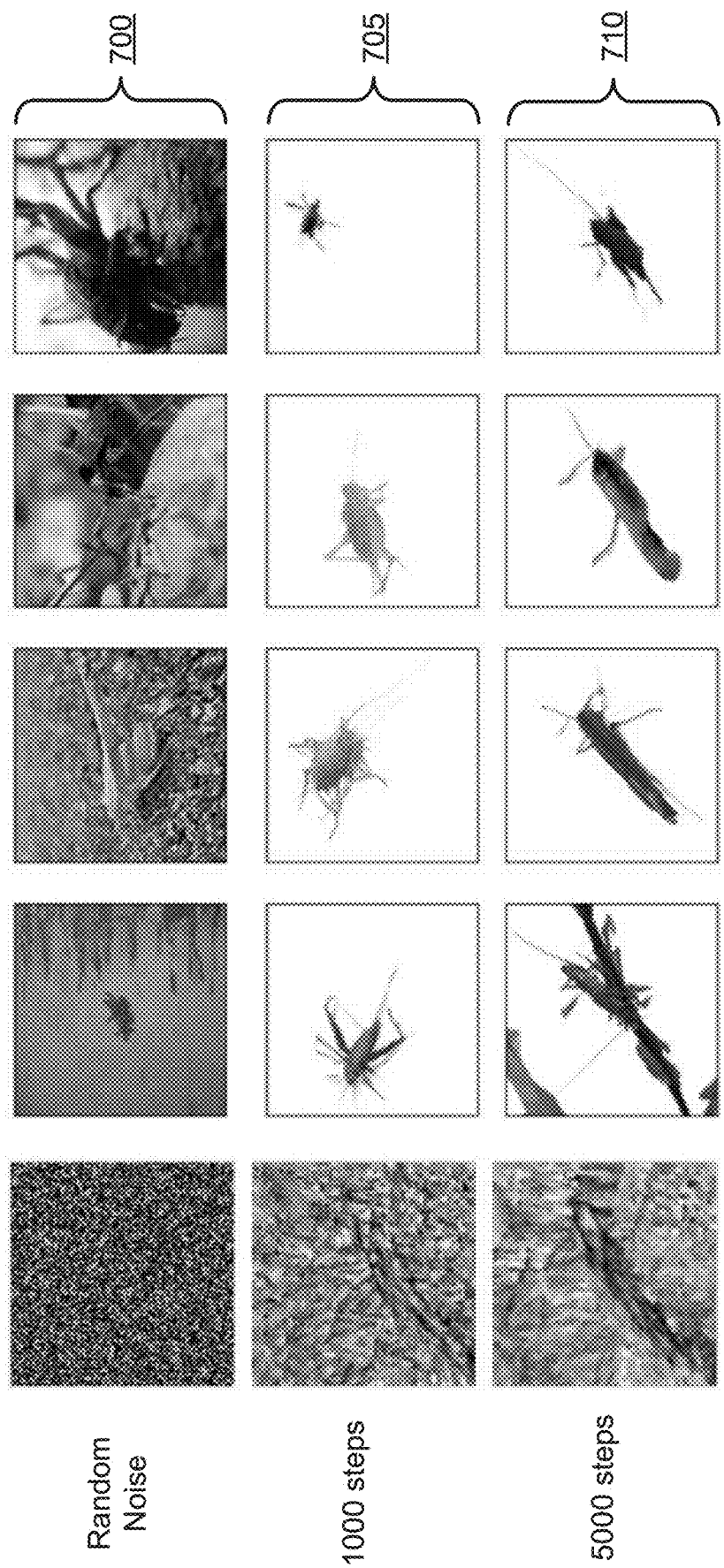
FIG. 7 shows an example of sampling outputs using inverting gradients method according to aspects of the present disclosure.

FIG. 7 shows an example of sampling outputs using inverting gradients method according to aspects of the present disclosure. The example shown includes first IG output 700, second IG output 705, and third IG output 710. The term IG herein is inverting gradients. FIG. 7 illustrates effect of sampling outputs over different steps of inverting gradients. As indicated on the left-hand side, FIG. 7 visualizes IG outputs over steps 0, 1000, 5000, respectively. The initial IG output (i.e., 0 step or first IG output 700) lacks localization. The localization information provided at 1000 step is less clear compared to localization information at 5000 step. That is, localization information shown in third IG output 710 (i.e., 5000 step) has increased quality than localization information shown in second IG output 705 (i.e., 1000 step).

Figure 8:
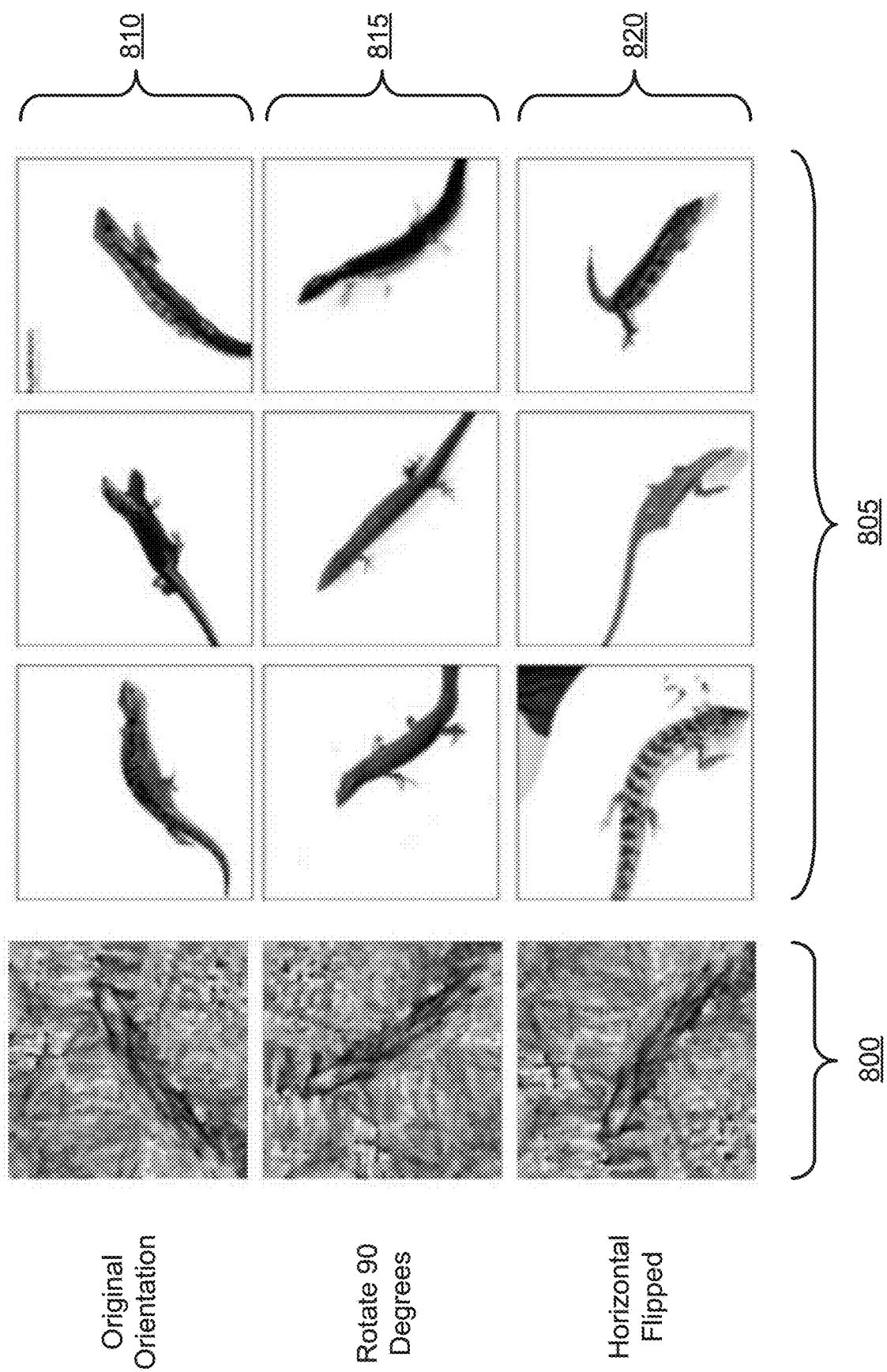
FIG. 8 shows an example of modifying random noise according to aspects of the present disclosure.

FIG. 8 shows an example of modifying random noise according to aspects of the present disclosure. The example shown includes object saliency noise 800, output images 805, original orientation 810, rotation 815, and flipping 820. FIG. 8 illustrates outputs after manipulating the input noise. The second row, i.e., rotation 815, indicates the object saliency noise is rotated by 90 degrees compared to original orientation 810. Hence, output images 805 are rotated by 90 degrees.

The third row, i.e., flipping 820, indicates the object saliency noise is horizontally flipped. Hence, output images 805 are horizontally flipped compared to original orientation 810. That is, the orientation of output images changes in accord with input noise's rotation, flip, etc.

Inverting gradients model 225 as shown in FIG. 2 generates the object saliency noise based on a reference image by updating random noise to resemble the reference image. Object saliency noise 800 is an example of, or includes aspects of, the corresponding element described with reference to FIGS. 3, 5, 6, 11, and 12. Output images 805 are an example of, or include aspects of, the corresponding element described with reference to FIGS. 3, 5, 6, and 12.

Figure 9:
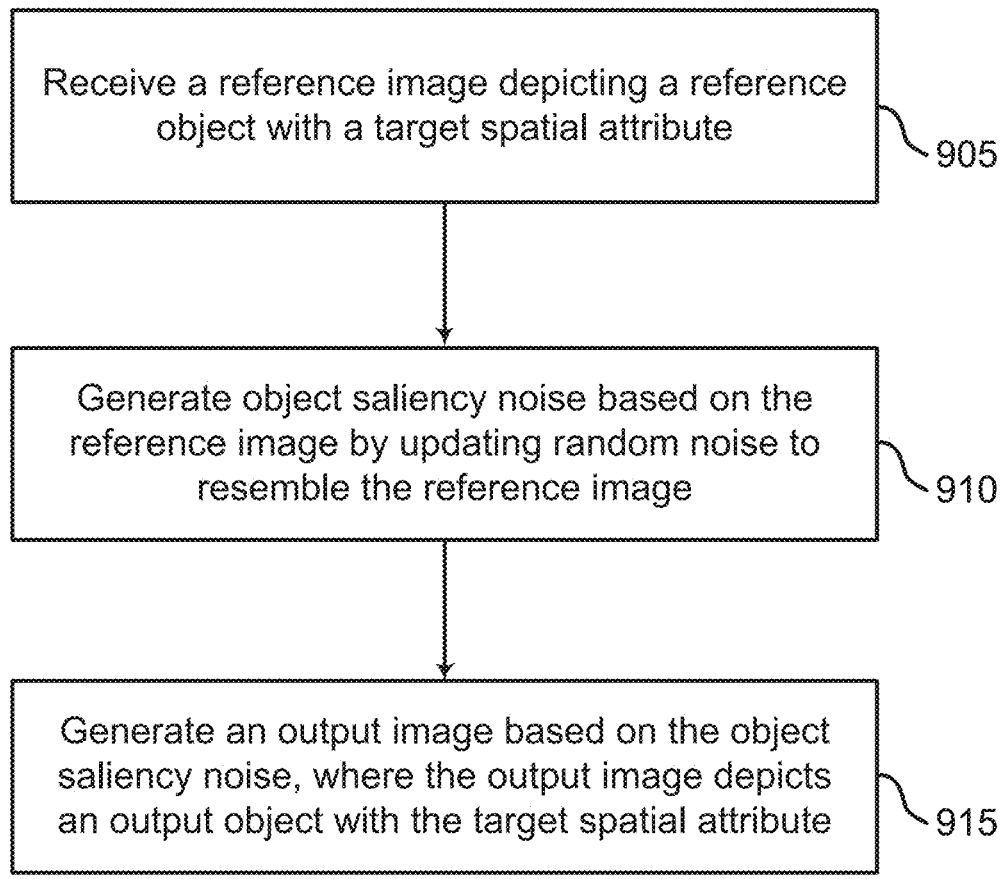
FIG. 9 shows an example of a method for image generation according to aspects of the present disclosure.

FIG. 9 shows an example of a method for image generation according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 905, the system receives a reference image depicting a reference object with a target spatial attribute. In some cases, the operations of this step refer to, or may be performed by, a machine learning model as described with reference to FIGS. 2 and 3.

At operation 910, the system generates object saliency noise based on the reference image by updating random noise to resemble the reference image. In some cases, the operations of this step refer to, or may be performed by, an inverting gradients model as described with reference to FIGS. 2 and 3. In some embodiments, an object saliency noise is used to attend to salient regions representing an object in the reference image (e.g., a peacock object). That is, the modified noise (i.e., the object saliency noise) captures the saliency and orientation of regions where the peacock locates in the reference image.

When the modified noise is supplied to a diffusion model (e.g., DDPM 230 as shown in FIG. 2), DDPM generates an output image with the same localization and orientation as indicated in the object saliency noise. The image processing apparatus conditions the output image by conditioning the input noise. According to some embodiments, the object saliency noise attends to the salient regions and guides the spatial attributes such as orientation and position of objects in the generated image. The object saliency noise follows the same input space (i.e., same range of input values) as comprehensible by DDPM because the diffusion model is not re-trained. The diffusion model starts with a random Gaussian noise $\sim N(0,I)$ and is updated subsequently.

At operation 915, the system generates an output image based on the object saliency noise, where the output image depicts an output object with the target spatial attribute. In some cases, the operations of this step refer to, or may be performed by, a DDPM as described with reference to FIGS. 2 and 3.

According to some embodiments, DDPM is configured to progressively degrade the image x for T time steps with Gaussian noise and then train a neural network to learn how to reverse the gradual noising process. During sampling, DDPM synthesizes data from pure noise using the learned denoising process. In some examples, sampling starts with noise $x_T$ and produces gradually less-noisy samples $x_{T-1}$, $x_{T-2}$, . . . to reach a final sample $x_0$.

Figure 10:
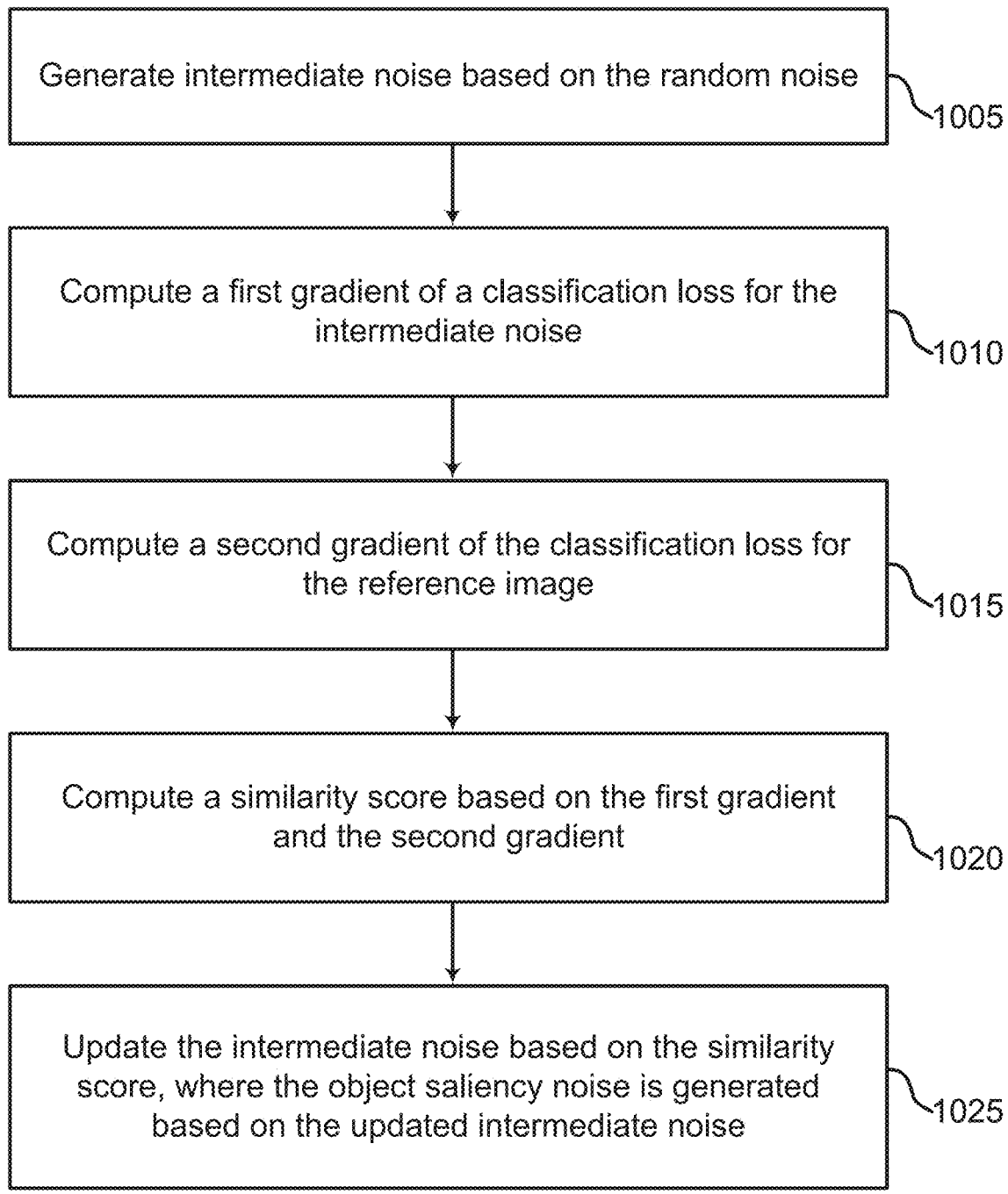
FIG. 10 shows an example of a method for generating object saliency noise according to aspects of the present disclosure.

FIG. 10 shows an example of a method for generating object saliency noise according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

At operation 1005, the system generates intermediate noise based on the random noise. In some cases, the operations of this step refer to, or may be performed by, an inverting gradients model as described with reference to FIGS. 2 and 3. Inverting gradients (IG) are used to obtain an object saliency noise that can represent the salient regions and the same range of input values for a diffusion model.

Inverting gradients model begins with a random Gaussian noise and iteratively updates the random noise to re-generate the original image. The image-space update of the intermediate image $x_T$ at each step happens such that the gradient of $x_T$ is similar to the gradient of the desired real image $I_R$.

At operation 1010, the system computes a first gradient of a classification loss for the intermediate noise. In some cases, the operations of this step refer to, or may be performed by, an inverting gradients model as described with reference to FIGS. 2 and 3. In some examples, the first gradient is denoted as $\nabla_\theta \mathcal{L}_\theta(x,y)$.

At operation 1015, the system computes a second gradient of the classification loss for the reference image. In some cases, the operations of this step refer to, or may be performed by, an inverting gradients model as described with reference to FIGS. 2 and 3. In some examples, the second gradient is denoted as $\nabla_\theta \mathcal{L}_\theta(x^*,y)$.

At operation 1020, the system computes a similarity score based on the first gradient and the second gradient. In some cases, the operations of this step refer to, or may be performed by, an inverting gradients model as described with reference to FIGS. 2 and 3. In some embodiments, let x* be the original image to be recreated, y be the corresponding true class and $\mathcal{L}_\theta(x^*,y)$ be the loss of the network's prediction for x* under parameters θ. The optimization task for inverting gradients can be formulated as follows:

$$\underset{x}{\arg\min} 1 - \frac{\langle \nabla_\theta \mathcal{L}_\theta(x, y), \nabla_\theta \mathcal{L}_\theta(x^*, y) \rangle}{\|\nabla_\theta \mathcal{L}_\theta(x, y)\| \|\nabla_\theta \mathcal{L}_\theta(x^*, y)\|} \quad (1)$$

According to an embodiment, the inverting gradients model is configured to locate an image x whose gradients have the maximum cosine similarity with the gradients of the desired image x*. The equation above is an example of computing a similarity score based on the first gradient and the second gradient.

Figure 12:
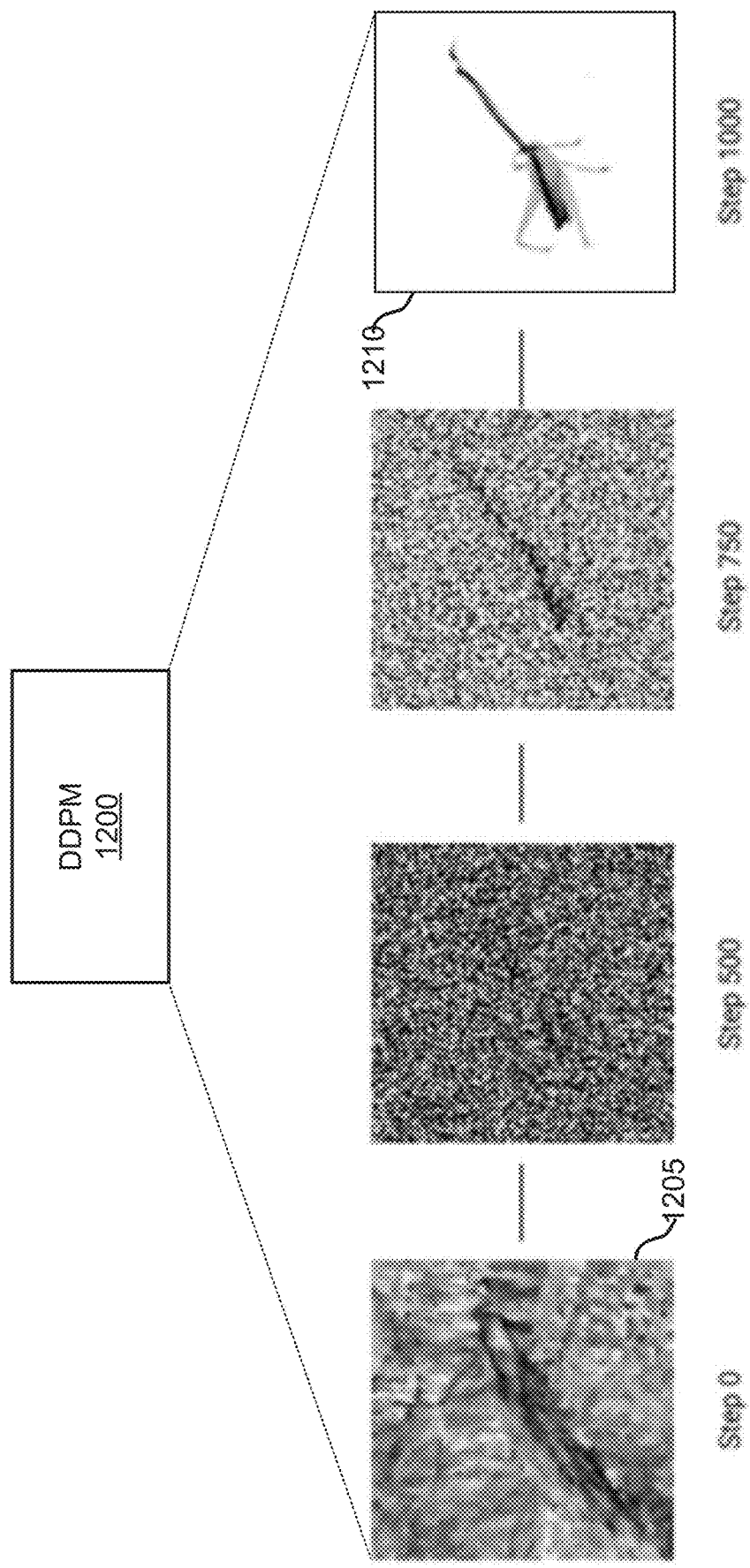
FIG. 12 shows an example of image generation via a diffusion model according to aspects of the present disclosure.

At operation 1025, the system updates the intermediate noise based on the similarity score, where the object saliency noise is generated based on the updated intermediate noise. In some cases, the operations of this step refer to, or may be performed by, an inverting gradients model as described with reference to FIGS. 2 and 3. According to an embodiment, the intermediate $x_T$ is updated according to an optimization task. In some cases, the progression of noise over multiple steps is shown in FIG. 12. Noisy samples are selected from intermediate steps (i.e., not the final generated image) since the input noise is used for conditioning with regards to orientation or localization. DDPMs update the random noise using optimization methods. These intermediate IG outputs are comprehensible input for diffusion models.

Figure 11:
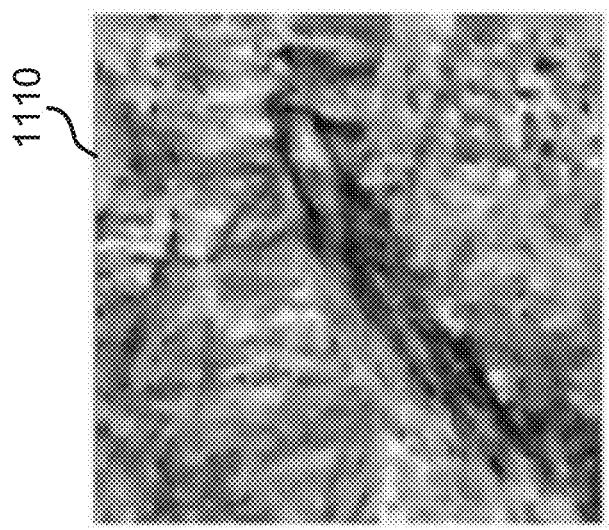
FIG. 11 shows an example of object saliency noise according to aspects of the present disclosure.
Figure 11:
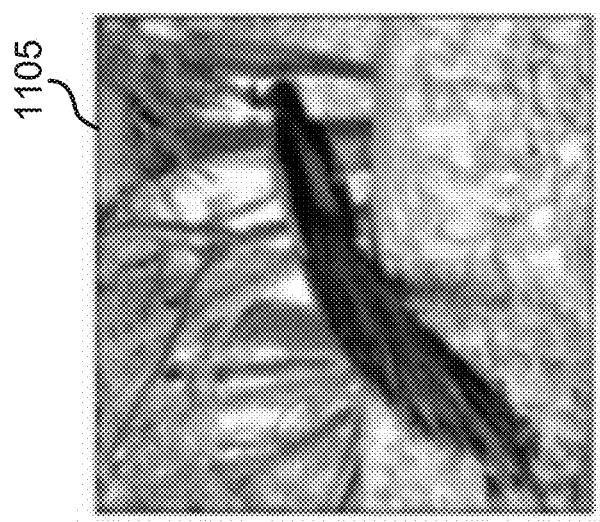
Figure 11:
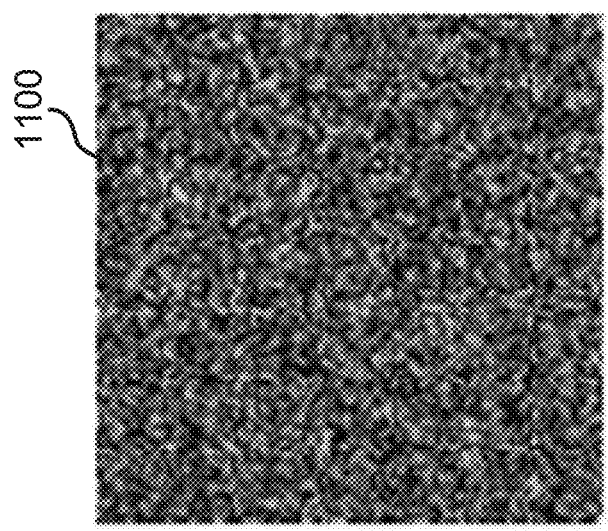

FIG. 11 shows an example of object saliency noise 1110 according to aspects of the present disclosure. The example shown includes random noise 1100, reference image 1105, and object saliency noise 1110. In some examples, the first image on the left, i.e., random noise 1100, indicates random Gaussian noise used in a diffusion model. The second image (middle) is reference image 1105 depicting a peacock object. The third image on the right indicates object saliency noise 1110 corresponding to reference image 1105. The third image highlights the object region. Comparing reference image 1105 and object saliency noise 1110, a set of salient regions of object saliency noise 1110 spatially correspond to a set of salient regions of reference image 1105, respectively.

As shown in FIG. 11, in some examples, random noise 1100 visualizes the default input noise that passes through DDPM, i.e., without the inverting gradients step. By generating object saliency noise 1110 based on reference image 1105, the input noise is conditioned and the conditioned noise leads to control over image generation in diffusion models, e.g., via DDPM.

Compared to completely random noise used in diffusion models, object saliency noise 1110 is used to attend to salient regions representing an object. Object saliency noise 1110 is visualized in the third image from the left. As shown in an example, object saliency noise 1110 is generated for reference image 1105 depicting a peacock. The modified noise (i.e., object saliency noise 1110) captures the saliency and orientation of regions where the peacock exists.

Random noise 1100 is an example of, or includes aspects of, the corresponding element described with reference to FIG. 12. Reference image 1105 is an example of, or includes aspects of, the corresponding element described with reference to FIGS. 3, 5, 6, and 8. Object saliency noise 1110 is an example of, or includes aspects of, the corresponding element described with reference to FIG. 12.

FIG. 12 shows an example of image generation via a diffusion model according to aspects of the present disclosure. The example shown includes DDPM 1200, object saliency noise 1205, and output image 1210. DDPM 1200 is an example of, or includes aspects of, the corresponding element described with reference to FIGS. 2 and 3. FIG. 12 illustrates a visualization of diffusion model image generation with object saliency noise. Object saliency noise includes salient regions. That is, object saliency noise is not random noise.

According to some embodiments, DDPM 1200 is configured to progressively degrade an image x for T time steps with Gaussian noise and then train a neural network to learn how to reverse the gradual noising process. During sampling, DDPM 1200 synthesizes data from pure noise using the learned denoising process. In some examples, sampling starts with noise $x_T$ and produces gradually less-noisy samples $x_{T-1}$, $x_{T-2}$, ... to reach a final sample $x_0$.

The forward noising process q at each iteration step is formulated as follows:

$$q(x_t | x_{t-1}) = N(x_t; \sqrt{1-\beta_t} x_{t-1}, \beta_t I) \quad (2)$$

where I is the identity matrix and $\beta_t$ is the constant defining the schedule of added noise.

In some cases, $\alpha_t = 1 - \beta_t$, $\bar{\alpha}_t = \Pi_{i=0}^{t} \alpha_i$, and then sampling is performed at an arbitrary time step t as follows:

$$q(x_t | x_0) = N(x_t; \sqrt{\bar{\alpha}_t} x_0, (1-\bar{\alpha}_t) I) \quad (3)$$

The equation above is reparametrized as follows:

$$x_t = \sqrt{\bar{\alpha}_t} x_0 + (1-\bar{\alpha}_t)\epsilon, \epsilon \sim N(0, I) \quad (4)$$

The reverse process p, parameterized by a θ is given as follows:

$$p_\theta(x_{t-1} | x_t) = N(x_{t-1}; \mu_\theta(x_t, t), \sigma_\theta^2(x_t, t)) \quad (5)$$

Further, $x_{t-1}$ can be predicted from $x_t$ as follows:

$$x_{t-1} = \frac{1}{\sqrt{\alpha_t}} \left( x_t - \frac{1-\alpha_t}{\sqrt{1-\bar{\alpha}_t}} \epsilon_\theta(x_t, t) \right) + \sigma_\theta z, z \sim N(0, I) \quad (6)$$

where the parametrized $\epsilon_\theta$ is the network learned for denoising.

In some examples, the outputs can be visualized over different diffusion model time steps at inference. Object saliency noise 1205 is an example of, or includes aspects of, the corresponding element described with reference to FIGS. 3, 5, 6, 8, and 11. Output image 1210 is an example of, or includes aspects of, the corresponding element described with reference to FIGS. 3, 5, 6, and 8.

Training

Figure 13:
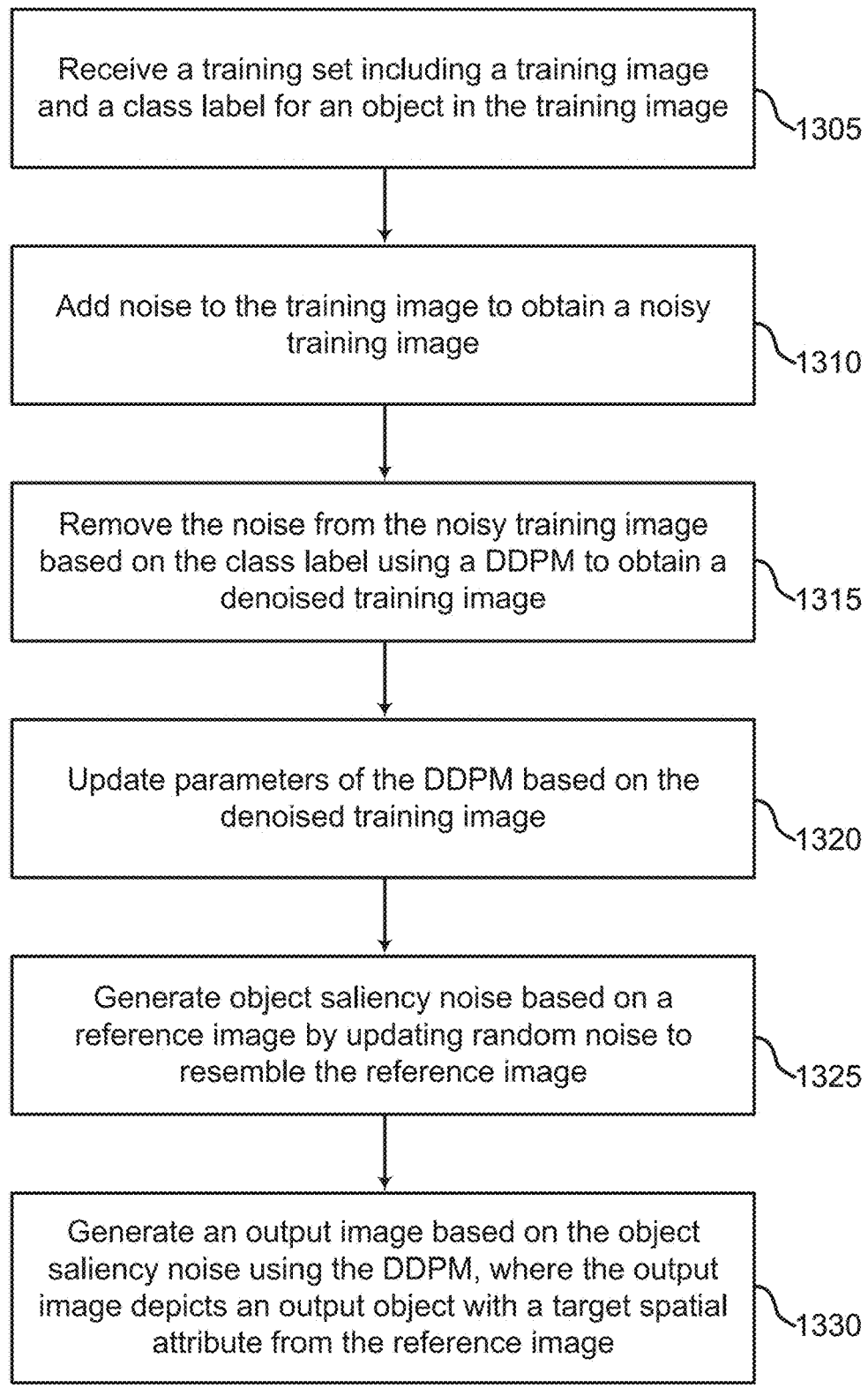
FIG. 13 shows an example of a method for training a denoising diffusion probabilistic model according to aspects of the present disclosure.

In FIGS. 13-14, a method, apparatus, and non-transitory computer readable medium for image processing are described. One or more embodiments of the method, apparatus, and non-transitory computer readable medium include receiving a training set comprising a training image and a class label for an object in the training image; adding noise to the training image to obtain a noisy training image; removing the noise from the noisy training image based on the class label using a DDPM to obtain a denoised training image; updating parameters of the DDPM based on the denoised training image; generating object saliency noise based on a reference image by updating random noise to resemble the reference image; and generating an output image based on the object saliency noise using the DDPM, wherein the output image depicts an output object with a target spatial attribute from the reference image.

Some examples of the method, apparatus, and non-transitory computer readable medium further include generating a plurality of progressively noisier versions of the training image. Some examples further include removing a portion of the noise from each of the plurality of progressively noisier versions of the training image to obtain a plurality of progressively denoised versions of the training image, wherein the parameters of the DDPM are updated based on the plurality of progressively denoised versions of the training image.

Some examples of the method, apparatus, and non-transitory computer readable medium further include training an image classification network to generate class labels for images, wherein the object saliency noise is generated using the image classification network.

Some examples of the method, apparatus, and non-transitory computer readable medium further include generating intermediate noise based on the random noise. Some examples further include computing a first gradient of a classification loss for the intermediate noise. Some examples further include computing a second gradient of the classification loss for the reference image. Some examples further include computing a similarity score based on the first gradient and the second gradient. Some examples further include updating the intermediate noise based on the similarity score, wherein the object saliency noise is generated based on the updated intermediate noise.

Some examples of the method, apparatus, and non-transitory computer readable medium further include identifying a target class label of the output object, wherein the output image is generated based on the target class label.

Some examples of the method, apparatus, and non-transitory computer readable medium further include modifying the object saliency noise based on input parameters of the DDPM to obtain normalized object saliency noise, wherein the DDPM is applied to the normalized object saliency noise. In some examples, the target spatial attribute includes a position, an orientation, a scale, a pose, or any combination thereof, and wherein the object saliency noise includes the target spatial attribute.

FIG. 13 shows an example of a method for training a denoising diffusion probabilistic model according to aspects of the present disclosure. In some examples, these operations are performed by a system including a processor executing a set of codes to control functional elements of an apparatus. Additionally or alternatively, certain processes are performed using special-purpose hardware. Generally, these operations are performed according to the methods and processes described in accordance with aspects of the present disclosure. In some cases, the operations described herein are composed of various substeps, or are performed in conjunction with other operations.

Supervised learning is one of three basic machine learning paradigms, alongside unsupervised learning and reinforcement learning. Supervised learning is a machine learning technique based on learning a function that maps an input to an output based on example input-output pairs. Supervised learning generates a function for predicting labeled data based on labeled training data consisting of a set of training examples. In some cases, each example is a pair consisting of an input object (typically a vector) and a desired output value (i.e., a single value, or an output vector). A supervised learning algorithm analyzes the training data and produces the inferred function, which can be used for mapping new examples. In some cases, the learning results in a function that correctly determines the class labels for unseen instances. In other words, the learning algorithm generalizes from the training data to unseen examples.

Accordingly, during the training process, the parameters and weights of the machine learning model are adjusted to increase the accuracy of the result (i.e., by attempting to minimize a loss function which corresponds in some way to the difference between the current result and the target result). The weight of an edge increases or decreases the strength of the signal transmitted between nodes. In some cases, nodes have a threshold below which a signal is not transmitted at all. In some examples, the nodes are aggregated into layers. Different layers perform different transformations on their inputs. The initial layer is known as the input layer and the last layer is known as the output layer. In some cases, signals traverse certain layers multiple times.

At operation 1305, the system receives a training set including a training image and a class label for an object in the training image. In some cases, the operations of this step refer to, or may be performed by, a training component as described with reference to FIG. 2.

At operation 1310, the system adds noise to the training image to obtain a noisy training image. In some cases, the operations of this step refer to, or may be performed by, a training component as described with reference to FIG. 2.

At operation 1315, the system removes the noise from the noisy training image based on the class label using a DDPM to obtain a denoised training image. In some cases, the operations of this step refer to, or may be performed by, a training component as described with reference to FIG. 2.

At operation 1320, the system updates parameters of the DDPM based on the denoised training image. In some cases, the operations of this step refer to, or may be performed by, a training component as described with reference to FIG. 2.

At operation 1325, the system generates object saliency noise based on a reference image by updating random noise to resemble the reference image. In some cases, the operations of this step refer to, or may be performed by, an inverting gradients model as described with reference to FIGS. 2 and 3. According an embodiment, the inverting gradients model is configured to maintain salient regions of a reference image. The inverting gradients model updates the noise by comparing the gradients of the generated image and a desired image. As gradients may account for the salient regions, the inverting gradients model updates noise around the salient regions based on the comparison. As such, the salient regions of the object saliency noise spatially correspond to the salient regions of the reference image, respectively.

Additionally, the inverting gradients model provides similar range of input values to the diffusion model for denoising. The inverting gradients model begins with a random Gaussian ~N(0,I) and updates it for generation. This is similar to DDPM that also updates the random noise via optimization. Therefore, intermediate inverting gradients outputs are a comprehensible input for the diffusion model.

At operation 1330, the system generates an output image based on the object saliency noise using the DDPM, where the output image depicts an output object with a target spatial attribute from the reference image. In some cases, the operations of this step refer to, or may be performed by, a DDPM as described with reference to FIGS. 2 and 3.

FIG. 14 shows an example of image generation algorithm according to aspects of the present disclosure. Algorithm 1400 relates to image generation using object saliency noise. Algorithm 1400 takes the following as input, i.e., classifier loss function $\mathcal{L}_\theta$, inverting gradients model I, inverting step k, diffusion model $\mathcal{D}_\phi$, localization guiding image x*, ground truth class y, and target class t. At line 1, $\nabla_\theta \mathcal{L}_\theta(x^*,y)$ is executed to assign value to grad. At line 2, I($\mathcal{L}_\theta$,grad,y,k) is executed to assign value to x. At line 3, $$\frac{x-\mu}{\sigma}$$

is executed to assign value to x'. At line 4, $\mathcal{D}_\phi(x',t)$ is executed to assign value to out. At line 5, the value of out is returned.

Performance of apparatus, systems and methods of the present disclosure have been evaluated, and results indicate embodiments of the present disclosure have obtained increased performance over existing technology. Example experiments demonstrate that image processing apparatus 235 outperforms conventional systems.

In some examples, for the initial noise modification, the inverting gradients model is pre-trained on ImageNet with ResNet18 architecture. In the next step of image generation, a pre-trained class conditioned DDPM is used to generate images of size 128×128. DDPM is pre-trained on ImageNet.

Example experiments and evaluation demonstrate the effectiveness of methods and image processing apparatus 235 as follows. Detail with regards to generation across multiple classes using single noise is described above in FIG. 5. Detail with regards to generation across single image class using single noise is described in FIG. 6. Detail with regards to generation across single class through manipulations of same noise is described in FIG. 8.

The description and drawings described herein represent example configurations and do not represent all the implementations within the scope of the claims. For example, the operations and steps may be rearranged, combined or otherwise modified. Also, structures and devices may be represented in the form of block diagrams to represent the relationship between components and avoid obscuring the described concepts. Similar components or features may have the same name but may have different reference numbers corresponding to different figures.

Some modifications to the disclosure may be readily apparent to those skilled in the art, and the principles defined herein may be applied to other variations without departing from the scope of the disclosure. Thus, the disclosure is not limited to the examples and designs described herein, but is to be accorded the broadest scope consistent with the principles and novel features disclosed herein.

In this disclosure and the following claims, the word "or" indicates an inclusive list such that, for example, the list of X, Y, or Z means X or Y or Z or XY or XZ or YZ or XYZ. Also, the phrase "based on" is not used to represent a closed set of conditions. For example, a step that is described as "based on condition A" may be based on both condition A and condition B. In other words, the phrase "based on" shall be construed to mean "based at least in part on." Also, the words "a" or "an" indicate "at least one."

What is claimed is:

1. A method comprising:
receiving a reference image and a target class, wherein the reference image depicts a reference object with a target location and a target orientation, and wherein the target class is different from a class of the reference object;
generating object saliency noise based on the reference image by updating random noise to include the target location and the target orientation of the reference object in the reference image; and
generating an output image by denoising the object saliency noise based on the target class, wherein the output image depicts an output object with the target class, and wherein the output object has the target location and the target orientation of the reference object from the reference image.

2. The method of claim 1, further comprising:
generating intermediate noise based on the random noise;
computing a first gradient of a classification loss for the intermediate noise;
computing a second gradient of the classification loss for the reference image;
computing a similarity score based on the first gradient and the second gradient; and
updating the intermediate noise based on the similarity score, wherein the object saliency noise is generated based on the updated intermediate noise.

3. The method of claim 2, further comprising:
generating classification features based on the intermediate noise using an encoder of an image classification network; and
applying a decoder of the image classification network to the classification features to obtain intermediate classification information, wherein the first gradient is computed based on the intermediate classification information.

4. The method of claim 1, wherein:
the object saliency noise is an initial noise input to a denoising model.

5. The method of claim 1, further comprising:
modifying the object saliency noise based on input parameters of a denoising model to obtain normalized object saliency noise, wherein the denoising model is applied to the normalized object saliency noise.

6. The method of claim 1, further comprising:
identifying a target class label different from a class label of the reference object, wherein the output object is characterized by the target class label.

7. The method of claim 1, wherein:
the target location and the target orientation include a position, an orientation, a scale, a pose, or any combination thereof.

8. The method of claim 1, wherein:
the object saliency noise includes the target location and the target orientation.

9. The method of claim 1, wherein:
a plurality of salient regions of the object saliency noise spatially correspond to a plurality of salient regions of the reference image, respectively.

10. A method comprising:
receiving a training set comprising a training image and a class label for an object in the training image;
adding noise to the training image to obtain a noisy training image;

removing the noise from the noisy training image based on the class label using a denoising model to obtain a denoised training image;

updating parameters of the denoising model based on the denoised training image;

receiving a reference image and a target class, wherein the reference image depicts a reference object with a target location and a target orientation, and wherein the target class is different from a class of the reference object;

generating object saliency noise based on the reference image by updating random noise to include the target location and the target orientation of the reference object in the reference image; and generating an output image by denoising the object saliency noise based on the target class, wherein the output image depicts an output object with the target class, and wherein the output object has the target location and the target orientation of the reference object from the reference image.

11. The method of claim 10, further comprising:

generating a plurality of progressively noisier versions of the training image; and removing a portion of the noise from each of the plurality of progressively noisier versions of the training image to obtain a plurality of progressively denoised versions of the training image, wherein the parameters of the denoising model are updated based on the plurality of progressively denoised versions of the training image.

12. The method of claim 10, further comprising:

training an image classification network to generate class labels for images, wherein the object saliency noise is generated using the image classification network.

13. The method of claim 10, further comprising:

generating intermediate noise based on the random noise;

computing a first gradient of a classification loss for the intermediate noise;

computing a second gradient of the classification loss for the reference image;

computing a similarity score based on the first gradient and the second gradient; and updating the intermediate noise based on the similarity score, wherein the object saliency noise is generated based on the updated intermediate noise.

14. The method of claim 10, further comprising:

identifying a target class label of the output object, wherein the output image is generated based on the target class label.

15. The method of claim 10, further comprising:

modifying the object saliency noise based on input parameters of the denoising model to obtain normalized object saliency noise, wherein the denoising model is applied to the normalized object saliency noise.

16. The method of claim 10, wherein:

the target location and the target orientation include a position, an orientation, a scale, a pose, or any combination thereof, and wherein the object saliency noise includes the target location and the target orientation.

17. A system comprising:

a memory component; and a processing device coupled to the memory component, the processing device configured to perform operations comprising:

receiving a reference image and a target class, wherein the reference image depicts a reference object with a target location and a target orientation, and wherein the target class is different from a class of the reference object;

generating object saliency noise based on the reference image by updating random noise to include the target location and the target orientation of the reference object in the reference image; and generating an output image by denoising the object saliency noise based on the target class, wherein the output image depicts an output object with the target class, and wherein the output object has the target location and the target orientation of the reference object from the reference image.

18. The system of claim 17, wherein:

the memory component includes parameters of an inverting gradients model or parameters of a denoising model.

19. The system of claim 17, further comprising:

an image classification network including an encoder and a decoder.

20. The system of claim 17, further comprising:

an optimizer configured to maximize a similarity between a gradient of the reference image and a gradient of the object saliency noise.

* * * * *